United States Patent [19]
Muller

[11] 4,019,460
[45] Apr. 26, 1977

[54] AQUARIUM TANK COVER

[76] Inventor: Louis M. Muller, 4021 Clifford Dr., Metairie, La. 70002

[22] Filed: June 30, 1976

[21] Appl. No.: 701,226

[63] Related U.S. Application Data

Continuation-in-part of Ser. No. 489,682, July 18, 1974, abandoned.

[52] U.S. Cl. .......................................... 119/5
[51] Int. Cl.² ................................ A01K 63/00
[58] Field of Search ............................. 119/3–5

[56] References Cited
UNITED STATES PATENTS

| | | | |
|---|---|---|---|
| 3,097,220 | 5/1963 | Willinger et al. | 119/5 |
| 1,333,454 | 3/1920 | Sato | 119/5 |
| 3,018,758 | 1/1962 | Arnould | 119/5 |

Primary Examiner—J. N. Eskovitz
Attorney, Agent, or Firm—Pugh & Keaty

[57] ABSTRACT

An aquarium tank cover especially for salt water systems having a top with horizontal support flanges for extending around the top edges of the tank, and vertical peripheral flanges or side walls loosely fitting within the tank and extending below the level of water within the tank, forming a block against the escape of splashing liquid droplets from the aquarium tank. Slots are provided in the vertical side walls of the cover above the water level in the tank to allow gases generated therein to escape and air to reach the surface of the water in the tank. Centrally opposed indentations are provided in the longer parallel sides of the cover, a larger indentation in one long side for receiving an outside filtering device, and a smaller indentation in the other long side allow feeding fish in the tank without lifting the cover. An accessory cover ledge for use with a modified top cover is illustrated in FIGS. 3–5.

10 Claims, 5 Drawing Figures

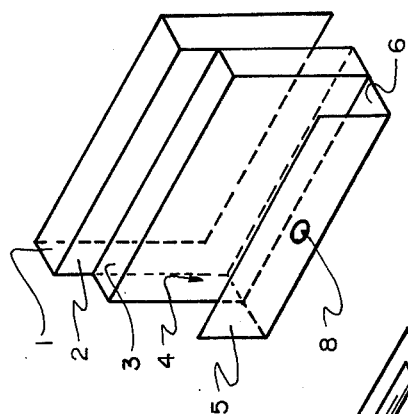
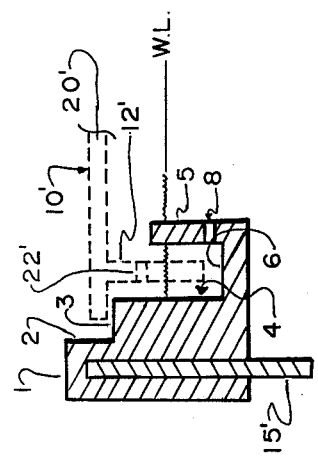
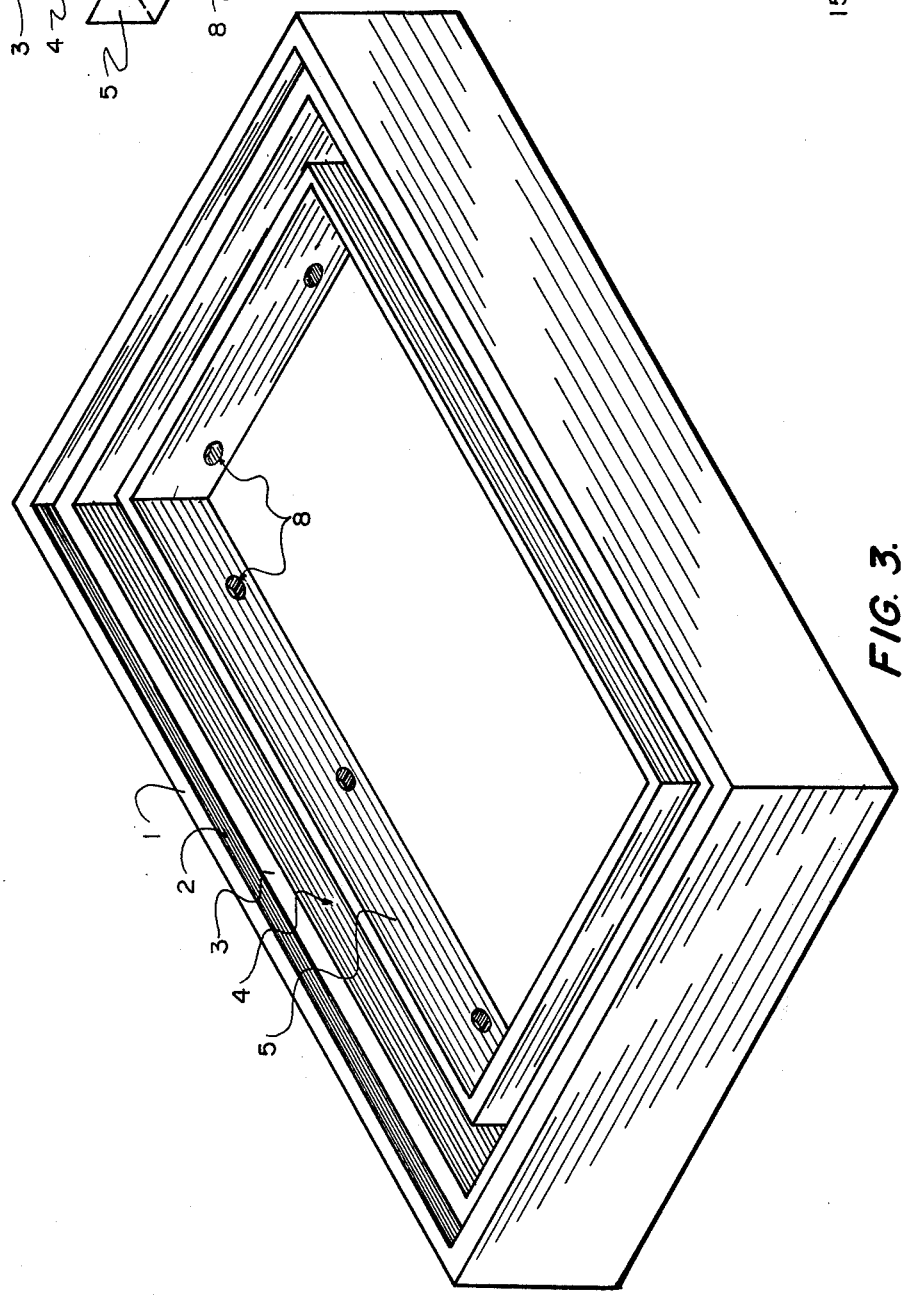

REFERENCE TO RELATED APPLICATION

This application is a continuation-in-part of the prior, copending application Ser. No. 489,682, filed July 18, 1974 and entitled "Cover for Aquarium Tanks," being abandoned in favor of this application.

BACKGROUND OF THE INVENTION

1. Field of the Invention

The invention relates generally to aquariums and more particularly to covers therefor.

2. Description of the Patent Prior Art

Heretofore aquariums have provided tops that allow the escape of splashing droplets from a filter return, such as for example is illustrated in U.S. Pat. No. 3,418,973 to Shinichi Saito. Other such tops are illustrated in Hovlid, U.S. Pat. No. 3,167,051, and Martinez, U.S. Pat. No. 3,464,387. The droplets wet the base supporting a tank and make an unsightly mess in addition to ruining the finish of the base.

Additionally reference is had to the following U.S. patents cited in the parent application: U.S. Pat. No. 3,091,220 to A. H. Willinger, et al.; U.S. Pat. No. 1,333,454 to N. Sato; and U.S. Pat. No. 3,018,758 to M. M. Arnould.

3. General Discussion of the Invention

A basic object of the present invention is to provide an improved cover for an aquarium tank that prevents the escape of water droplets therefrom without interfering with the escape of gases generated in the tank and the entrance of fresh air to the tank.

Recently there has been a keen public interest in salt water aquariums and fish. Some progress has been made in this field, for instance, metals are known to be detrimental to the health of salt water fish, hence metal frames for aquariums are obsolete. Likewise, it is an established fact that a balance of bacteria in the salt water aquarium is necessary. The bacteria balance is basically a numerical ratio between those bacteria that thrive on oxygen and those that do not. Each type does its part in converting toxic organic materials (i.e., food, excreta) to harmless inorganic materials. However, both types must be present and in balance to complete the bacterial conversion cycle. Therefore, for the oxygen loving bacteria, oxygen must be introduced into the aquarium water. This is usually accomplished by pumping air (oxygen) from a pump outside the aquarium through plastic tubing and ultimately through an air diffusor of some sort (e.g., air stone) located inside the tank and below the surface of the water. One cannot introduce too much oxygen in water, therefore, a good, strong, forceful pump and diffusion of the air into minute bubbles is most desirable.

Now, finally, one comes to the cover of the present invention. The function of this cover can be compared to the cover of a household pressure cooker. The cover of the pressure cooker fits tightly, and is locked in place. Inside the pot heat converts water in the pot to steam and the steam rises and condenses on the underside of the cover. More and more steam collects and soon the water will be dripping from the cover and along to the sides and back into the pot. This is a similar function to that of the present invention. The air, pumped into the aquarium tank (pot), when diffused by an air stone, creates air bubbles (similar to steam but not hot) which rise above the water surface, burst, and water will collect on the underside of the cover. Soon water will drip from the cover and along to the sides of the cover to the side wall flanges used in the cover of the present invention (the flanges, perpendicular to the top and parallel to the walls of the tank stop the water drops from ever reaching the sides of the tank) and back into the tank. This is one part of the function of the present invention.

However, one should note a big difference between the pressure cooker cover and the cover of the present invention. The pressure cooker cover is locked tightly in place. The cover of the present invention is not air tight. In fact, there should be about an exemplary quarter inch lateral space between the outside side wall perimeter of the cover and the walls of the tank. Additionally the horizontal edges of the flat, rectangular top part of the cover can rest loosely over the walls of the tank or alternatively loosely inside the tank on the plastic support lips which fit over the upper edges of the glass walls of the tank and which have become standard on most if not all modern tanks. This looseness of fit usually occurs inherently due to the unevenness of the surfaces involved, which occurs within the accepted manufacturer's tolerances in flat top covers such as that of the preferred embodiment of the present invention. As a further alternative, the cover can even be suspended with a plastic bar in either of these two places, without a tight gas sealing fit. This is a matter of the manufacturers personal preference. Precise or exact positioning is not an absolute feature of the present invention. The most important factor in the present invention is in the structure and operation of the flanges on the cover and the interrelationships between the top part of the cover, the flanges, the water level and the tank.

It is also noted that the flat, rectangular top part of the cover of the preferred embodiment of the present invention is in itself an important feature because it is generally or preferably in one piece and water cannot penetrate through it. Many conventional covers have sliding glass tops, but the space between the sliding and fixed parts is vulnerable and water does accumulate there and, when the water evaporates, only the salt residue remains. Even a simple, partial crack in glass will permit water accumulation, and ultimately a salt residue results.

Referring back to the pressure cooker cover analogy, if too much steam pressure arises the pop-off valve will open and steam will exit lowering the pressure inside. In the present invention, too much pressure is never created in the aquarium. However, the air bubbles pumped into the tank do burst furiously at the water surface and spew water in all directions much like steam. So now the second primary function of the cover of the present invention and in particular of the flanges is being considered. Any excess air or other gases (e.g., nitrogen, harmful to fish) that accumulate into the cover escape, not through a pop-off valve, but through the slots or openings in the flanges. It should be noted that the slots are above the water level and the side wall flanges of the cover extend below the water level. Likewise bubbles that float atop on the water and are washed near or against the flanges cannot reach the glass tank sides but they do break and squirt water and gases through the slots against the walls of the tank but beneath the peripheral support lip of the cover and, thus, if it is liquid, it rolls back into the tank and, if gaseous, it escapes to the outer confines of the room.

Thus, it should be understood that the cover at least substantially covers over the open top of the tank to prevent indiscriminate escaping of water droplets, and substantially eliminates the escaping water droplet problem of the prior art.

The top member of the preferred embodiment of the present invention can achieve such by either completely covering over the top of the tank without any openings (other than gaps due for example to uneven interfacing surfaces between the top member and the supporting tank walls or can include one or two limited openings for purposes of for example feeding and/or positioning of filtering equipment.

BRIEF DESCRIPTION OF THE DRAWINGS

For a further understanding of the nature and objects of the present invention, reference should be made to the following detailed description, taken in conjunction with the accompanying drawings, in which like parts are given like reference numerals and wherein:

FIG. 1 is a side view of a preferred embodiment of the aquarium tank cover of the present invention in position on an aquarium tank, with the near side of the tank cut away and the water level partially illustrated; while

FIG. 3 is a top, perspective view of a cover ledge to be put over and around the top of the aquarium tank walls for use with a modified top cover 10' (similar in design to the top cover 10 of FIG. 1 but having among other differences a row of holes in place of the slots 22); while FIG. 4 is a schematic perspective view showing the cross-sectional configuration of the cover ledge of FIG. 3; and FIG. 5 is a side, cross-sectional view of the cover ledge of FIG. 3, showing its fit with the top cover 10' (shown in phantom line) and the tank walls 15'.

DETAILED DESCRIPTION OF THE PREFERRED EMBODIMENTS

Basic Cover Structure

Figure 1:
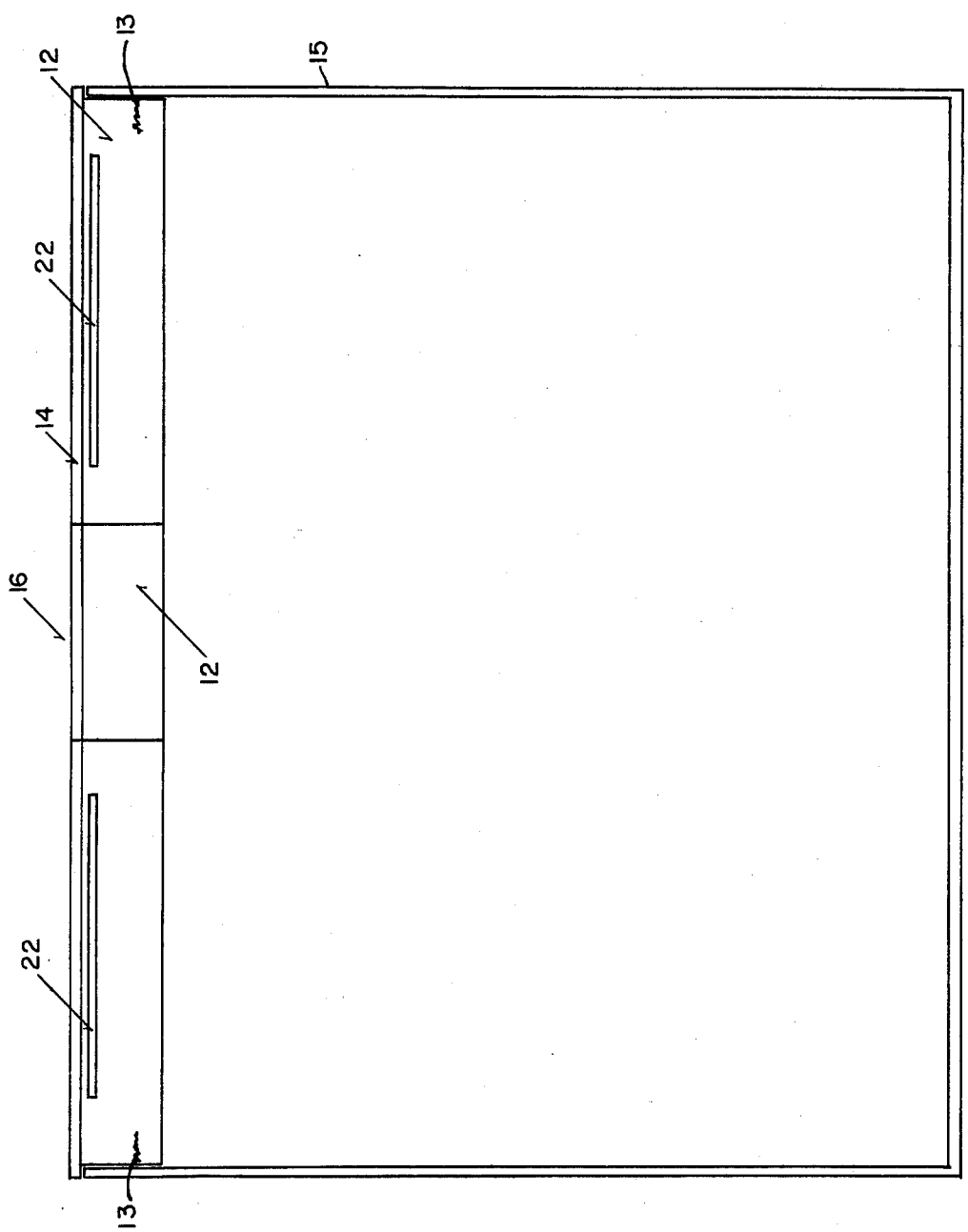
Figure 2:
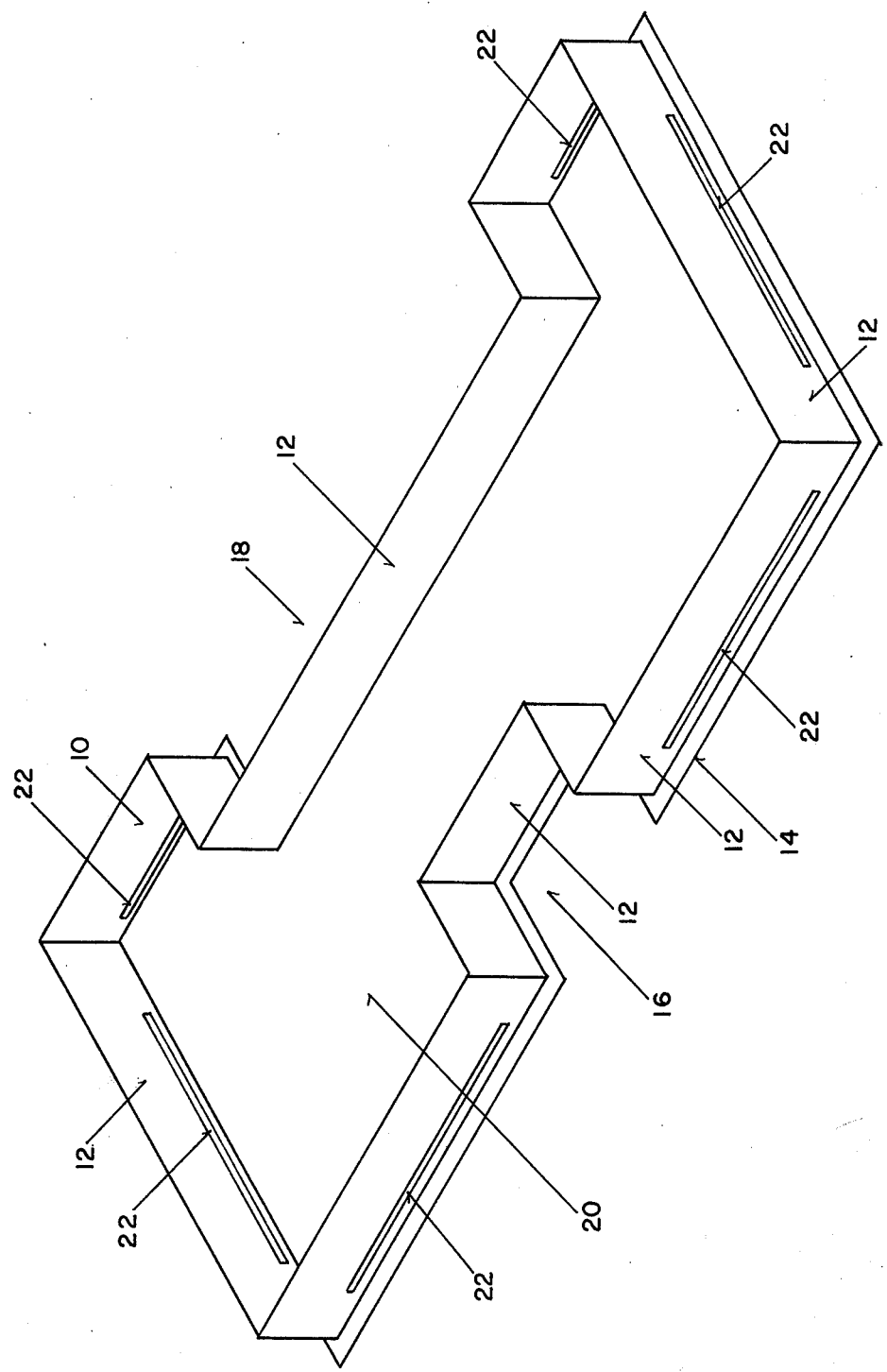
FIG. 2 is a perspective view of the preferred embodiment of FIG. 1 taken obliquely from the bottom of the cover.

Referring to FIGS. 1 and 2, the preferred embodiment of the cover of the present invention comprises an aquarium tank cover 10 having vertical side walls or vertical blocking flanges 12 set back from the peripheral edges of cover 10 to define horizontal support flange members 14. The side walls 12 are adapted to fit inside the walls 15 of the aquarium tank (shown in FIG. 1) with the horizontal support members or flanges 14 supported on and covering the upper edges of walls 15. Side walls 12 depend and extend below the water level 13 (schematically illustrated in FIG. 1) to which the aquarium tank is filled.

Referring particularly to FIG. 2, the longer opposing side walls of the cover 10 are unequally indented to define indentation areas 16 and 18 for the respective purposes of providing openings for feeding and for positioning an outside filter.

Top member 20 of cover 10 is preferably integral with the horizontal support flanges 14 and is normal to the peripheral side walls 12. The peripheral side walls 12 and the top 20 form a water blocking structure with the surface of the water as defined by water level 13.

Horizontally extended slots 22 are provided in the side walls 12 above said water level 13 for permitting the escape of gases generated in the tank and the entrance of air for aerating the water contained in the tank.

The flat, generally rectangular portion 20 of the cover can be for example glass about ⅛" thick and either may horizontally extend over the four side walls of the aquarium (and be directly supported by the side walls) as illustrated or rest on the standard plastic trim ledge (not illustrated) that usually protrudes about ¼" into the tank on all four sides and the horizontal ledge of which is located about ¼" down from the top of the sides of the aquarium. As to the latter, this plastic ledge is a part of the upper trim of the tank. This trim is a standard part of aquariums that conceals and covers the cutting edges of the glass walls, enhances the appearance and supports conventional covers presently on the market.

In either application the glass top must not fit tightly and have at least small gap(s) between it and the tank (due for example to uneven surfaces), because there must be air communication from within the tank with the outside. Also, in either case the cover 10 is supported by the tank walls 15, either directly as illustrated or indirectly through the standard plastic ledge trim.

The four vertical, side wall flanges 12 can be of plastic attached and permanently sealed to the glass top 20. These flanges can be for example about ⅛" thick and are perpendicular to the top and extend down into the tank about an exemplary 1½" to 2" (depending on how the cover 10 is supported on the walls of the tank, which is higher or on the plastic ledge, which is lower) just clearing laterally (for example by a ¼") the tank walls 15 or the plastic trim ledge (as the case may be) on descent. The water level in an aquarium is usually kept to about ½" to ¾" from filling the tank completely. Therefore, the four descending flanges 12 (acting in effect as four sides) together with the glass top 20 (acting as it is — a top) and the water surface (acting as the bottom) effectively form a closed box. If air is pumped into the tank through an air stone located in the tank, the rising air and bubbles will surface and be trapped in the "box" described above.

In each of the four flanges 12 the slots 22 can for example extend about three fourths (¾) of the horizontal length of each flange. The slots 22 can for example form relatively small openings of about 1/16" to ⅛" in vertical width. These openings are parallel to and can be for example about ¼" to ½" from the glass top 20 (depending again on the location of the support for the cover 10, either walls 15 of the tank or the standard plastic ledge). It is of course necessary that the slots be above the water level, but below the top edge of the tank 15 or the plastic trim ledge if there is one. The primary functions of the side wall flanges 12 are threefold.

a. The slots in the flanges serve as vents that prevent pressure buildup in the box and permit the escape of harmful nitrogenous gases and all other gases to the outside of the tank.

b. Bubbles that rise to the surface and breaksplash in all directions. Most of the spew is accumulated on the glass top as water droplets that move over to the flanges (the slots 22 are for example located ¼" to ½" below the top in the flanges 12) and down the flanges back into the tank. Generally the only way any of the splash can get out is through the slots 22 because as discussed the location of the slots 22 is below the tank top or the plastic trim ledge (as the case may be). Those comparatively few "well aimed" squirts that do go through the slots 22 hit the walls 15 of the tank but are confined to the tank beneath the tank top or the plastic trim ledge.

c. The bubbles that do not break immediately, glide across the surface of the water and will rest against one of the flanges 12 and eventually burst harmlessly inside the box. At this point it is noteworthy to mention that the surface of the water in that small area between the flanges and the walls of the tank is placid, while within the confines of the box the surface of the water may appear to be boiling. This is because all the turbulence or action is within the box.

Throughout this description reference was made to the four flanges and, in fact, there are four, but the two long ones (front and back) are preferably recessed in the side centers. The recession 16 in the front is to provide for example a feeding place. It is only recessed about an exemplary 1" from the tank wall and can be several (for example 7 or 8) inches in length. The recession 18 in the back flange is about exemplary 1¾" from the tank wall and about 10½" long. This space 18 is to accommodate for example an outside filter. In both instances the flanges 12 are continuous and uninterrupted—only recessed. These two recessions or indentions or limited openings can easily be covered with a light sheet of plastic to prevent the escape of aquarium creatures.

Cover Ledge Accessory

As an adjunct or an accessory to a modified top cover 10' there is included a cover ledge as part of an alternate embodiment of the present invention, which cover ledge is illustrated in FIGS. 3–5. The cover ledge fits over and around the top lip of the tank walls in place of the standard plastic trim edge and includes a channel 4 into which the side wall flanges 12' of the cover 10' (similar in design to top cover 10 discussed above) extends below the water level in the tank.

The cover ledge channel 4 can for example be approximately ⅜" wide and 1" deep and, while the standard plastic ledge trim previously described extends an exemplary ¼" horizontally into the tank, the channel will begin ¼" from the tank walls (begins where the standard ledge trim stops) and extends an exemplary ⅜" further into the tank. It is noted that Sections 1, 2 and 3 of the cover ledge are similar in design and structure to the standard plastic ledge trim referred to above.

The channel extends continuously and completely around the inside perimeter of the tank. The descending flanges 12' of the cover 10' fit down into the channel 4 and thus doubly waterlock the contents of the aquarium. The top of the outer walls 5 of the channel 4 will stop an exemplary ¼" below the ledge 3 (yet above the water level) thus posing no interference with the vents 22' in the flanges 12' and, importantly, will not permit fish to swim into the channel and be injured when the flanges are placed therein. As can be seen, occasional weep holes 8 are employed to allow the rise and lowering of the water level in the channel with that of the aquarium proper.

It is also noted that the central area of the rear wall, where for example the filtering device and heater are to be located, the channel 4 is continuous. Therefore, it will be necessary to make a minor change in the rear part of the cover (10/10')—that is an exemplary ¼" notch (not illustrated) should be included in the flange 12' in two places to accommodate the wall 5 of the channel 4. The notches will stop about ¼" below the flange attachment to the glass top 20'. The channel 4 will also eliminate the opening 16 originally described (feeding opening) in the front part of the cover 10 because now a conventional hinged door (not illustrated) can be employed overlapping the flanges 12' within the channel 4 at the ends of the hinge. Also a "plug" or smaller "cover within the cover" works beautifully. A smaller rectangular cover with four flanges sits down into channels just as the larger one does and it can also be hinged. The only other optional change of consequence would be that the flanges 12' need to descend into the channel 4 a distance about an exemplary ¼" from the bottom of the channel 4 except in that area where the heater and filter will be located. In this one area it will be necessary for the flanges 12' to project to the original depth of about an exemplary 1½" down into the tank (not the channel) as this is the first and main barrier to floating bubbles. The outer wall 5 of the channel 4 will be a second barrier. Another optional change would be to replace the slots 22 in the flanges with a row of holes 22' being about an exemplary ⅛" in diameter.

Because many varying and different embodiments may be made within the scope of the inventive concept herein taught and because many modifications may be made in the embodiments herein detailed in accordance with the descriptive requirements of the law, it is generally understood that the details herein are to be interpreted as illustrative and not in a limiting sense.

What is claimed as invention is:
1. An improved cover for an aquarium tank designed with a given water level and having an open top, comprising:
   a horizontally extended top member adapted to at least generally completely cover over the open top of the tank and be supported by the walls of the tank, there however being as least some small gap(s) between the sides of the tank and the corresponding facing surface(s) of said top member to allow gases to escape and air to enter;
   downwardly depending flange means spaced inwardly a relatively short distance from the periphery and at least substantially around the periphery of said top member for extending down inside and inwardly around said tank and below the water level therein, said downwardly depending flange means being spaced from each other a distance close to but at least in part less than the distance walls of the tank, whereby there is a small space between said downwardly depending flange means and the sides of the tank; and relatively small side opening means defined in said depending flange means and above said water level for permitting the escape of gases generated in said tank and the entrance of fresh air into said tank through said small space and said gap(s), whereby said cover substantially prevents the escape of water droplets from said tank without hermetically sealing it.

2. The cover of claim 1 wherein said top member is generally rectangular in shape and includes two top opening means therein, one for allowing feeding and the other for positioning water filtering equipment.

3. The cover of claim 1 wherein said side opening means are elongated, straight slots located parallel to said top member.

4. The cover of claim 3 wherein said slots extend along substantially the full horizontal length of said downwardly depending flange means at least in those areas where said flanges are in close proximity to the tank's walls.

5. The cover of claim 1 wherein said top member includes at least one top opening means therein for allowing feeding.

6. The cover of claim 1 wherein said top member includes at least one top opening means therein for positioning water filtering equipment.

7. The cover of claim 1 wherein there is further included a cover ledge accessory which fits over and around and is supported by the upper portion of the tank walls, said ledge accessory having ledge portions about its length extending horizontally into the interior of the tank, said top member resting on said ledge portions and being supported by the tank wall through said cover ledge accessory and its ledge portions.

8. The cover of claim 7 wherein said cover ledge accessory includes horizontally extended channel means located further towards the interior of the tank then said ledge portions and extending down below said ledge portions to a level below the water level in the tank for receiving said flange means therein.

9. The cover of claim 8 wherein said chamber includes supplemental opening means therein below the tank water level for communicating with the body of water to insure that the water level in said channel and the tank are the same.

10. The cover of claim 1 wherein said opening means are a series of holes located along the horizontal length of said flange means.

* * * * *